United States Patent
Gopalan et al.

(10) Patent No.: US 10,551,882 B2
(45) Date of Patent: Feb. 4, 2020

(54) CLOSE CLEARANCE HINGE SYSTEMS

(71) Applicant: Intel Corporation, Santa Clara, CA (US)

(72) Inventors: Shankara Venkatraman Gopalan, Bengaluru (IN); Prasanna Pichumani, Bangalore (IN); Rajeev Rema Shanmugam, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 15/699,896

(22) Filed: Sep. 8, 2017

(65) Prior Publication Data

US 2018/0314302 A1 Nov. 1, 2018

(30) Foreign Application Priority Data

Apr. 26, 2017 (IN) .............................. 201741014771

(51) Int. Cl.
*G06F 1/16* (2006.01)

(52) U.S. Cl.
CPC .......... *G06F 1/1681* (2013.01); *G06F 1/1647* (2013.01)

(58) Field of Classification Search
CPC .... G06F 1/1681; G06F 1/1647; Y10T 16/547; E05D 3/12; E05D 3/18; H04M 1/022
See application file for complete search history.

(56) References Cited

U.S. PATENT DOCUMENTS

| | | | | |
|---|---|---|---|---|
| 2,463,031 | A * | 3/1949 | Hallinan | G05D 23/127 192/82 T |
| 2,519,384 | A * | 8/1950 | Lebermann | B41J 29/15 400/718.2 |
| 3,465,357 | A * | 9/1969 | Anderson | G11B 15/26 242/336 |
| 4,438,891 | A * | 3/1984 | Wiig | G11B 15/50 242/334.6 |
| 6,009,667 | A * | 1/2000 | Mizukami | E05D 3/122 16/354 |
| 7,299,523 | B2 * | 11/2007 | Zou | G06F 1/1616 16/277 |
| 7,328,481 | B2 * | 2/2008 | Barnett | E05D 3/08 16/227 |

(Continued)

*Primary Examiner* — Victor D Batson
*Assistant Examiner* — Matthew J Sullivan
(74) *Attorney, Agent, or Firm* — Grossman, Tucker, Perreault & Pfleger, PLLC

(57) ABSTRACT

A variable pitch clamshell hinge for use with clamshell housings includes a first shaft coupled to a first variable diameter device and a second shaft coupled to a second variable diameter device. The first variable diameter device and the second variable diameter device are coupled together using an inelastic linking element. As the shafts are rotated in a first direction the variable diameter devices increase in diameter. As the shafts are rotated in a second direction that is opposite the first direction, the variable diameter devices decrease in diameter. As the variable diameter devices increase in diameter, the inelastic linking element exerts a compressive force on the variable diameter devices, decreasing the distance (i.e., the pitch) between the shafts. As the variable diameter devices decrease in diameter, the inelastic linking element relaxes the compressive force on the variable diameter devices, increasing the distance between the shafts.

21 Claims, 7 Drawing Sheets

(56) References Cited

U.S. PATENT DOCUMENTS

| | | | | |
|---|---|---|---|---|
| 7,520,028 | B2* | 4/2009 | Borleis | E05D 3/122 16/354 |
| 8,385,991 | B2* | 2/2013 | Wang | E05D 3/18 16/221 |
| 8,769,772 | B2* | 7/2014 | Griffin | H04M 1/0216 16/354 |
| 8,966,715 | B1* | 3/2015 | Chen | H04M 1/022 16/303 |
| 8,978,206 | B2* | 3/2015 | Hsu | F16H 19/08 16/227 |
| 9,677,308 | B1* | 6/2017 | Chen | E05D 3/18 |
| 9,715,255 | B2* | 7/2017 | Sprenger | G06F 1/1681 |
| 9,964,989 | B2* | 5/2018 | Krivoy | G06F 1/1618 |
| 10,036,189 | B2* | 7/2018 | Chen | E05D 3/14 |
| 2015/0160695 | A1* | 6/2015 | Su | E05D 3/12 16/366 |
| 2017/0145725 | A1* | 5/2017 | Siddiqui | E05F 3/20 |
| 2018/0049336 | A1* | 2/2018 | Manuel | E05B 65/0067 |
| 2018/0309861 | A1* | 10/2018 | Lin | E05D 3/12 |
| 2018/0329462 | A1* | 11/2018 | Larsen | G06F 1/1681 |
| 2018/0341288 | A1* | 11/2018 | Senatori | G06F 1/1618 |

\* cited by examiner

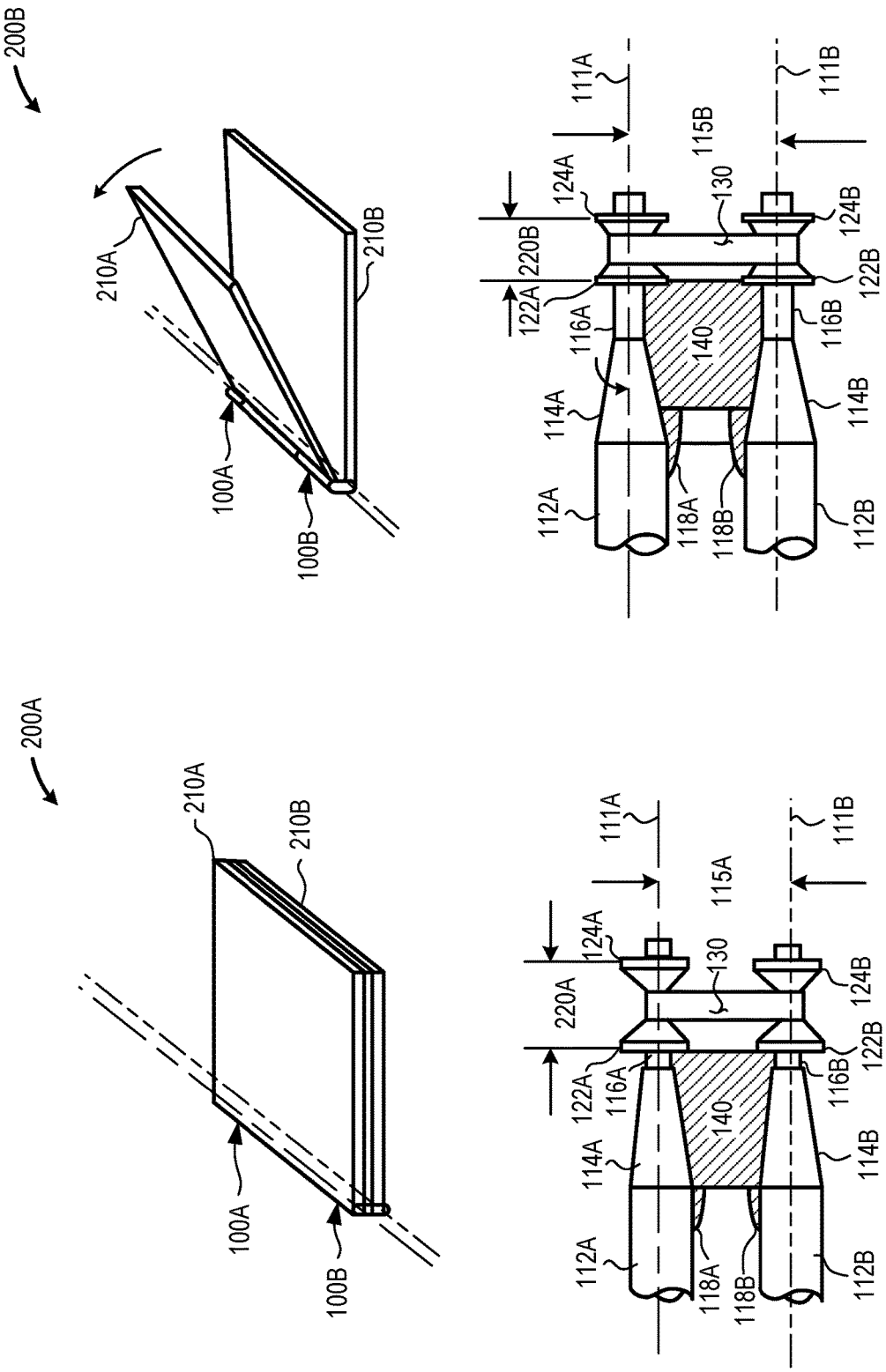

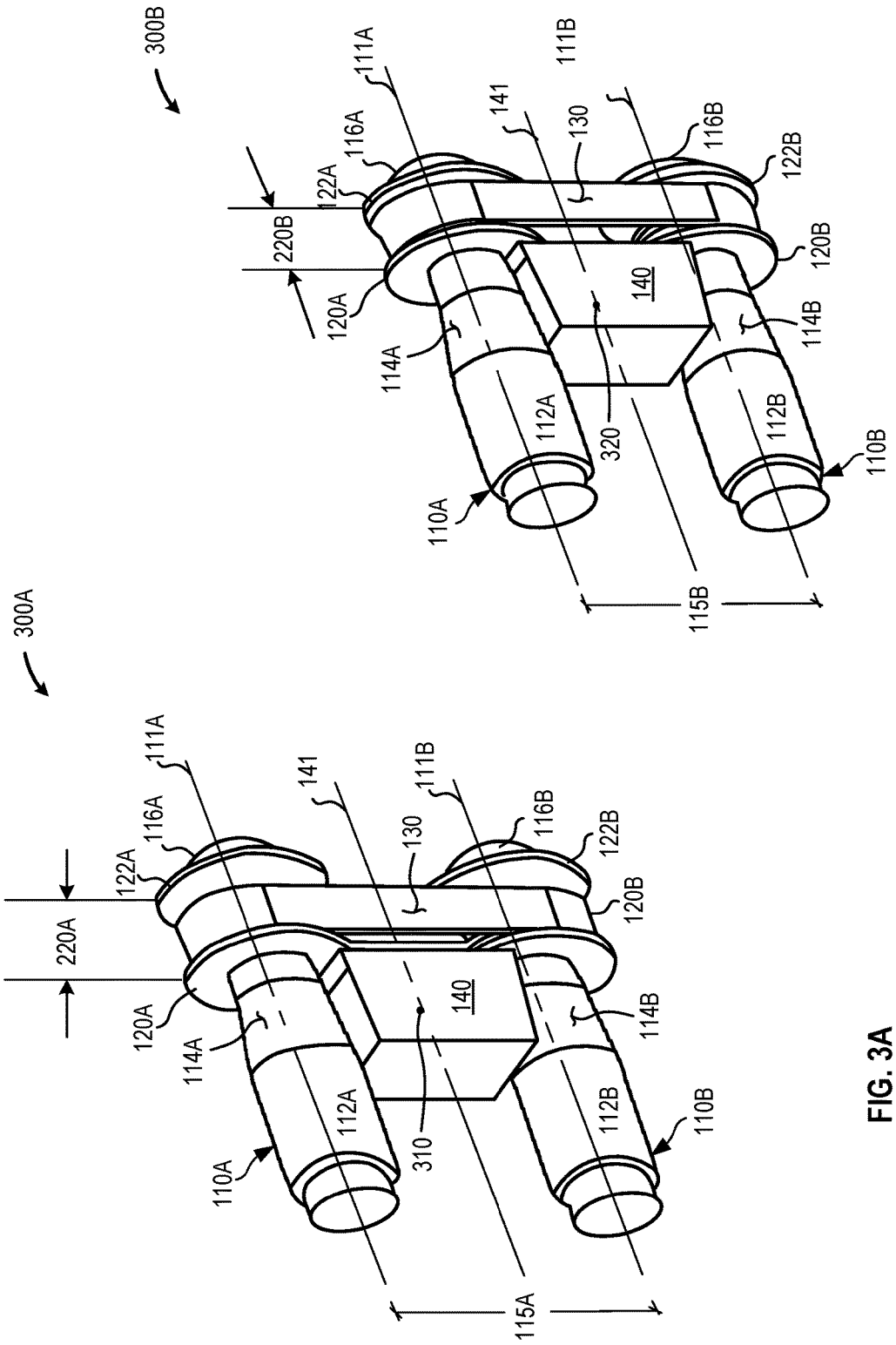

CLOSE CLEARANCE HINGE SYSTEMS

CROSS-REFERENCE TO RELATED APPLICATIONS

This present application claims the benefit of, and priority to, Indian Patent Application No. 201741014771, filed on Apr. 26, 2017, the entire disclosure of which is incorporated herein by reference.

TECHNICAL FIELD

The present disclosure relates to hinge systems used with clamshell electronic devices.

BACKGROUND

Clamshell electronic device housings typically include a first device housing and a second device housing that are pivotably coupled using one or more hinges and configured such that the device may be opened and closed in a manner very similar to a book or magazine. Traditionally, the hinge permitted the rotation of the first device housing through an arc measured with respect to the second device housing. The hinge maintained a fixed spacing between the device housings regardless of the angle at which the first device housing was positioned with respect to the second device housing. In fact, device designers frequently take advantage of the gap that exists between the device housings and position ventilation features (slots, etc.) along the edge of the device housing proximate the hinge.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 2A is an elevation view of an illustrative hinge and an illustrative clamshell device that depicts the location of the truncated tapered member and the variable diameter device when the clamshell device is in a CLOSED (i.e., positioned at 0° of arc) state, in accordance with at least one embodiment described herein;

FIG. 2B is an elevation view of an illustrative hinge and an illustrative clamshell device that depicts the location of the truncated tapered member and the variable diameter device when the clamshell device is in a partially OPEN (i.e., positioned at 45° of arc) state, in accordance with at least one embodiment described herein;

FIG. 3A is a perspective view of an illustrative hinge disposed in a first position in which the diameter of the variable diameter device is minimized, the separation distance of the variable diameter device is maximized, and the first distance between the first shaft and the second shaft is maximized, in accordance with at least one embodiment described herein;

FIG. 3B is a perspective view of the illustrative hinge disposed in a second position in which the diameter of the variable diameter device is maximized, the separation distance of the variable diameter device is minimized, and the second distance between the first shaft and the second shaft is minimized, in accordance with at least one embodiment described herein;

DETAILED DESCRIPTION

Figure 1:
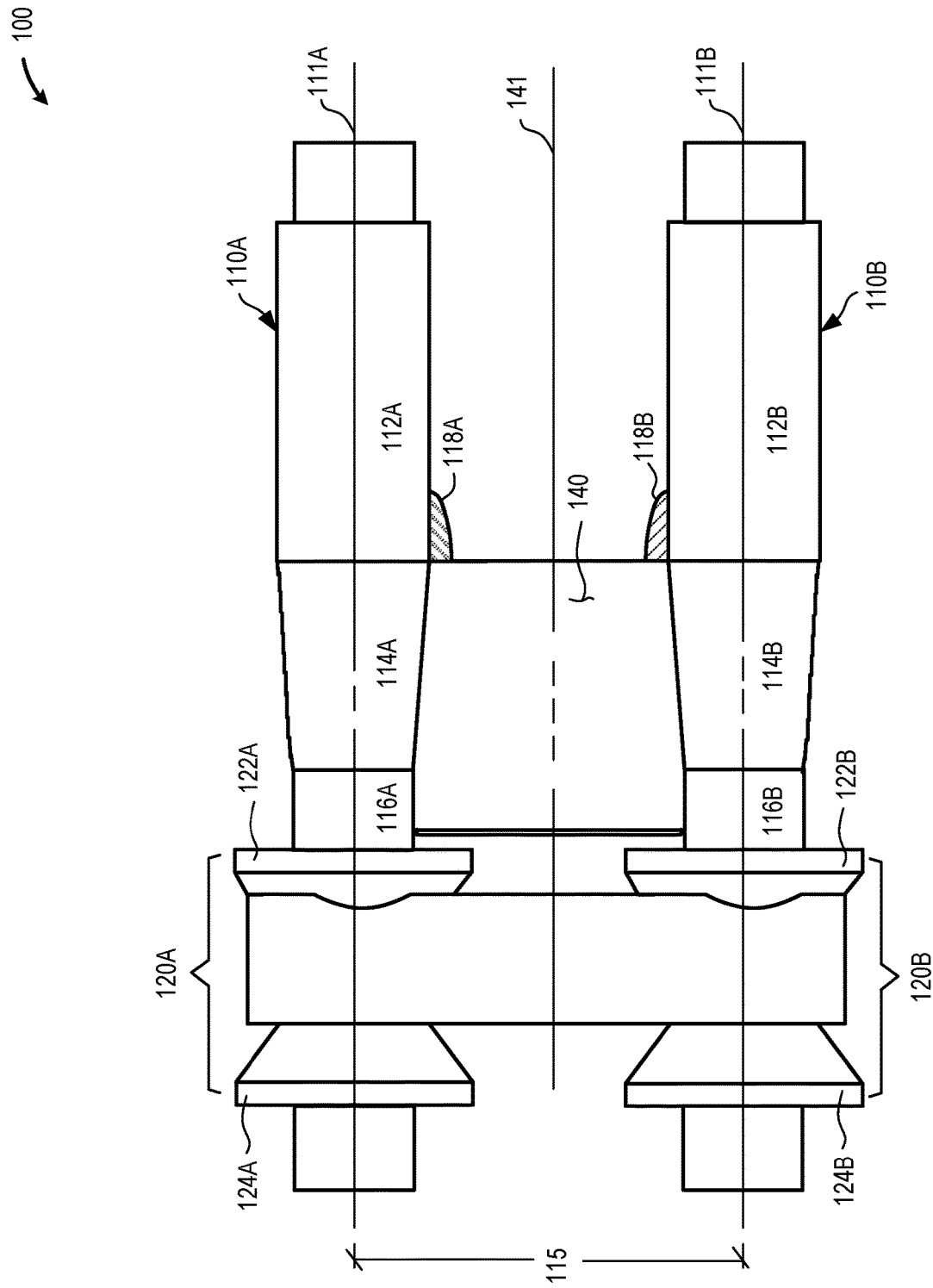
FIG. 1 is an elevation view of an example hinge that includes a first shaft that includes a first variable diameter device and a second shaft that includes a second variable diameter device and in which the first variable diameter device and the second variable diameter device are coupled by a linking element, in accordance with at least one embodiment described herein.

The systems and methods described herein provide a hinge mechanism capable of varying the air gap between electronic device housings used to provide a clamshell electronic device housing. The systems and methods described herein include a hinge having a first shaft with a first axis of rotation and a second shaft having a second axis of rotation. The first shaft axis of rotation and the second shaft axis of rotation are separated by a first distance ($d_1$) when the clamshell electronic device is in a CLOSED position. As the clamshell electronic device is opened, the distance between the first shaft axis of rotation and the second shaft axis of rotation is reduced to a second distance ($d_2$). Depending on the clamshell electronic device, the hinge may be configured to provide the second distance between the first shaft axis of rotation and the second shaft axis of rotation at any desired angle between the first device housing and the second device housing (90°, 135°, 180°, etc.).

The systems and methods described herein provide a hinge that includes a first shaft coupled to the first device housing and a second shaft coupled to the second device housing. Each shaft includes a variable diameter device that changes or increases in diameter as the clamshell electronic device is opened. A non-elastomeric linking element couples the variable diameter device on the first shaft to the variable diameter device on the second shaft such that as the variable diameter devices increase in diameter, the linking element exerts a compressive force that "pulls" the first shaft towards the second shaft, reducing the distance between the shafts from a first distance to a lesser second distance. The rate at which the variable diameter devices change diameter determines the angle between the first device housing and the second device housing at which the second distance is achieved.

Traditional hinges permitted an air gap of about 0.8 millimeters (mm) for small clamshell devices such as smartphones to 1.5 mm for larger devices such as laptops and convertibles. The trend toward more aggressive form factors and dual display designs favor a reduced airgap between housings to provide continuity between the displays.

A clamshell hinge is provided. The clamshell hinge may include a first variable diameter member disposed concentrically about a first shaft having a first axis of rotation; a second variable diameter member disposed concentrically about a second shaft having a second axis of rotation, the second axis of rotation parallel to the first axis of rotation; a fixed length member slideably disposed about at least a portion of a perimeter of the first variable diameter member and slideably disposed about at least a portion of a perimeter of the second variable diameter member; where, responsive to a rotation of the first shaft through a first arc in a first direction, the first variable diameter member increases in diameter reducing the distance between the first shaft and the second shaft; and where, responsive to a rotation of the first shaft through the first arc in a second direction opposite the first direction, the first variable diameter member decreases in diameter increasing the distance between the first shaft and the second shaft.

A clamshell device is provided. The clamshell device may include: a first housing; a second housing; a first shaft having a first axis of rotation physically coupled to the first housing; a second shaft having a second axis of rotation physically coupled to the second housing, the second axis of rotation parallel to the first axis of rotation; at least one clamshell hinge that includes: a first variable diameter member disposed concentrically about the first shaft; a second variable diameter member disposed concentrically about the second shaft; a fixed length member slideably disposed about at least a portion of a perimeter of the first variable diameter member and slideably disposed about at least a portion of a perimeter of the second variable diameter member; wherein, responsive to a rotation of the first shaft through a first arc in a first direction, the first variable diameter member increases in diameter reducing the distance between the first housing and the second housing to a first distance; and wherein, responsive to a rotation of the first shaft through the first arc in a second direction opposite the first direction, the first variable diameter member decreases in diameter increasing the distance between the first housing and the second housing to a second distance that is greater than the first distance.

A method of forming a clamshell device is provided. The method may include: operably coupling a first housing to a first shaft rotatably coupled to at least one clamshell hinge; operably coupling a second housing to a second shaft rotatably coupled to the at least one clamshell hinge; wherein the first shaft has a first axis of rotation; wherein the second shaft has a second axis of rotation, the second axis of rotation parallel to the first axis of rotation; wherein the at least one clamshell hinge includes: a first variable diameter member disposed concentrically about the first shaft; a second variable diameter member disposed concentrically about the second shaft; a fixed length member slideably disposed about at least a portion of a perimeter of the first variable diameter member and slideably disposed about at least a portion of a perimeter of the second variable diameter member: where, responsive to a rotation of the first shaft through a first arc in a first direction, the first variable diameter member increases in diameter reducing the distance between the first housing and the second housing to a first distance; and where, responsive to a rotation of the first shaft through the first arc in a second direction opposite the first direction, the first variable diameter member decreases in diameter increasing the distance between the first housing and the second housing to a second distance that is greater than the first distance.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in one or more additional databases, each having an identified relationship to the accessed element. In another example, if "A" is logically associated with "B," accessing "A" will expose or otherwise draw information and/or data from "B," and vice-versa.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Note that in the following discussion specific components are designated using an alphanumeric item designator. For example, a first shaft may be designated 110A and a second shaft may be designated 110B. For ease of discussion and conciseness, when describing a feature common to both items, the alphanumeric designator is omitted. Thus, when such a generic (i.e., non-alphanumeric) designator is used, the described feature should be understood as applicable to all items sharing a common numeric designator, thus a feature described with respect to "shaft 110" would apply to all shafts 110A-110n. On the other hand, a feature described with respect to "shaft 110A" would apply specifically to shaft 110A and not to shafts 110B-110n.

FIG. 1 is an elevation view of an example hinge 100 that includes a first shaft 110A that includes a first variable diameter device 120A and a second shaft 110B that includes a second variable diameter device 120B and in which the first variable diameter device 120A and the second variable diameter device 120B are coupled by a linking element 130, in accordance with at least one embodiment described herein. As depicted in FIG. 1, the first variable diameter device 120A includes a two-piece variable diameter pulley that includes a first pulley portion 122A that is slideably displaceable along the first shaft 110A and a second pulley portion 124A that is at a fixed location on the first shaft 110A. Similarly, the second variable diameter device 120B includes a two-piece variable diameter pulley that includes a first pulley portion 122B that is slideably displaceable along the second shaft 110B and a second pulley portion 124B that is at a fixed location on the second shaft 110B. The first shaft 110A rotates about a first axis of rotation 111A and the second shaft 110B may rotate about a second axis of rotation 111B. The hinge 100 may be disposed partially or completely within a hinge enclosure through which the first shaft 110A and the second shaft 110B protrude. In embodiments, the first shaft 110A may be coupled to a first device housing (not visible in FIG. 1) and the second shaft 110B may be coupled to a second device housing (also not visible in FIG. 1).

In embodiments, the first shaft 110A may include a variety of sections, each having the same or different diameters. As depicted in FIG. 1, the first shaft 110A may include a larger diameter section 112A and a smaller diameter section 116A coupled by a tapered section 114A having a gradually changing diameter that smoothly transitions from the diameter of the larger diameter section 112A to the diameter of the smaller diameter section 116A. Similarly, the second shaft 110B may include a variety of sections, each having the same or different diameters. As depicted in FIG. 1, the second shaft 110B may include a larger diameter section 112B and a smaller diameter section 116B coupled by a tapered section 114B having a gradually changing diameter that smoothly transitions from the diameter of the larger diameter section 112B to the diameter of the smaller diameter section 116B. The first shaft 110A and the second shaft 110B are separated by a distance 115 when the clamshell electronic device is in a CLOSED position. The distance 115 is at a maximum value when the clamshell electronic device is in the CLOSED position and is at a minimum value when the clamshell electronic device is in the OPEN position— when a first device housing coupled to the first shaft 110A is rotated about the first axis of rotation 111A through an arc to a defined angle (90°, 135°, 180°, etc.) measured with respect to a second device housing coupled to the second shaft 110B.

A truncated tapered member 140 is disposed between the first shaft 110A and the second shaft 110B. The truncated tapered member 140 may translate along a longitudinal axis 141 as the first shaft 110A rotates. In some implementations, one or more appliances may be disposed in, on, or about the first shaft 110A and/or one or more appliances may be disposed in, on, or about the second shaft 110B to apply a force to the truncated tapered member 140 as the first shaft 110A is rotated about the first axis of rotation 111A and/or the second shaft 110B is rotated about the second axis of rotation 111B. Although not visible in FIG. 1, such appliances may include, but are not limited to one or more structures, such as one or more ramps, wedges, or helical spirals, disposed in, on, or about at least a portion of the perimeter or circumference of the first shaft 110A, the second shaft 110B, or both the first shaft 110A and the second shaft 110B. In some implementations, such appliances may include one or more cams, lobes, or similar devices that are molded integral with the first shaft 110A, the second shaft 110B, or both the first shaft 110A and the second shaft 110B. In yet other implementations, such appliances may include, but are not limited to, one or more biasing members (helical springs, leaf springs, etc.) capable of providing a force to the truncated tapered member 140.

In operation, as the clamshell device is opened, a rotational force exerted by a system user on the first housing coupled to the first shaft 110A causes the first shaft 110A to rotate about the first axis of rotation 111A in a first direction. The rotation of the first shaft 110A as the clamshell device opens exerts a force on the truncated tapered member 140 that forces the slideably displaceable first pulley portion 122A on the first shaft 110A and the slideably displaceable first pulley portion 122B on the second shaft 110B to move towards the fixed first pulley portion 124A and towards the fixed first pulley portion 124B. As the first pulley halves 122 approach the second pulley halves 124, the diameter of the variable diameter devices (i.e., pulleys as depicted in FIG. 1) 120 increases. Since the linking element 130 does not stretch, as the diameter of the variable diameter devices 120 increases, the linking element 130 exerts a compressive force on the shafts 110, reducing the distance between the shafts 110.

In operation, as the clamshell device closes, the rotational force exerted in the first shaft 110A causes the first shaft 110A to rotate about the first axis of rotation 111A in a second direction that is opposite the first direction. The rotation of the first shaft 110A as the clamshell device closes releases the force on the truncated tapered member 140 allowing the slideably displaceable first pulley portion 122A on the first shaft 110A and the slideably displaceable first pulley portion 122B on the second shaft 110B to move away from the fixed first pulley portion 124A and away from the fixed first pulley portion 124B. As the first pulley halves 122 separate from the second pulley halves 124, the diameter of the variable diameter devices (i.e., pulleys as depicted in FIG. 1) 120 decreases. Since the linking element 130 does not stretch, as the diameter of the variable diameter devices 120 decreases, the compressive force exerted by the linking element 130 on the shafts 110 is reduced, reducing the shafts 110 to separate and increasing the distance between the shafts 110. In embodiments, the friction between the variable diameter devices 120 and the linking element 130 determines the torque needed to open and close the clamshell device.

The first shaft 110A and the second shaft 110B (collectively, "shafts 110") may be fabricated using one or more materials such as one or more metals, metal alloys, plastics, carbon fiber, or similar. In some implementations, the first shaft 110A may be operably coupled to a first housing and the second shaft 110B may be operably coupled to a second housing. In embodiments, the first housing may include one or more electronic devices, such as one or more system input devices (keyboard, pointer, touchscreen, scanner, etc.) and/or one or more system output devices (display, touchscreen, haptic output, etc.). In embodiments, the second housing may include one or more electronic devices, such as one or more system input devices (keyboard, pointer, touchscreen, scanner, etc.) and/or one or more system output devices (display, touchscreen, haptic output, etc.). The first shaft 110A rotates about a first axis of rotation 111A and the second shaft 110B rotates about a second axis of rotation 111B. In embodiments, the first axis of rotation 111A is parallel to the second axis of rotation 111B. The distance 115 between the first axis of rotation 111A and the second axis of rotation 111B varies with the diameter of the variable diameter devices 120. As the diameter of the variable diameter devices 120 increases, the distance 115 between the first axis of rotation 111A and the second axis of rotation 111B decreases. As the diameter of the variable diameter devices 120 decreases, the distance 115 between the first axis of rotation 111A and the second axis of rotation 111B increases.

The shafts 110 may have the same or different diameters. The shafts 110 may have a single (i.e., continuous or unchanging) diameter or a variable diameter, such as depicted in FIG. 1. In embodiments, the first shaft 110A and the second shaft 110B may include a relatively larger large shaft diameter portion 112A, 112B, respectively (collectively, "large shaft diameter portion 112"). The large shaft diameter portion 112A of the first shaft 110A may operably couple to the first housing. The large shaft diameter portion 112B of the second shaft 110B may operably couple to the second housing. In embodiments, the first shaft 110A and the second shaft 110B may include a relatively smaller small shaft diameter portion 116A, 116B, respectively (collectively, "small shaft diameter portion 116"). The small shaft diameter portion 116A of the first shaft 110A may be disposed, in whole or in part, in a housing disposed about the hinge 100. The small shaft diameter portion 116B of the second shaft 110B may be disposed, in whole or in part, in a housing disposed about the hinge 100. A tapered shaft section 114A may join the large diameter shaft portion 112A and the small diameter shaft portion 116A of the first shaft 110A. Similarly, a tapered shaft section 114B may join the large diameter shaft portion 112B and the small diameter shaft portion 116B of the second shaft 110B.

In embodiments, a first appliance 118A may be disposed in, on, or about the first shaft 110A. In some implementations, the first appliance 118A may cause a displacement of the truncated tapered member 140 along axis 141. In embodiments, rotation of the first shaft 110A in a first direction may exert a force on the truncated tapered member 140 sufficient to cause the truncated tapered member 140 to travel along axis 141 toward the first pulley portion 122A. In embodiments, rotation of the first shaft 110A in a second direction may release the force from the truncated tapered member 140, allowing the truncated tapered member to travel along axis 141 away from the first pulley portion 122A. The first appliance 118A may include one or more spirals, one or more protrusions, or similar structures capable of exerting a force on the truncated tapered member 140 as the first shaft 110A is rotated in the first direction. In embodiments, a first appliance 118A may be cast, machined, or otherwise integrally formed with the first shaft 110A. For example, the first appliance 118A may include a cam, lobe, or similar structure capable of exerting a force on the truncated tapered member 140 as the first shaft 110A is rotated in the first direction. In embodiments, the first appliance 118A may release the force applied to the truncated tapered member 140 when the first shaft 110A is rotated in a second direction opposite the first direction.

In embodiments, a second appliance 118B may be disposed in, on, or about the second shaft 110B. In some implementations, the second appliance 118B may cause a displacement of the truncated tapered member 140 along axis 141. In embodiments, rotation of the second shaft 110B in a first direction may exert a force on the truncated tapered member 140 sufficient to cause the truncated tapered member 140 to travel along axis 141 toward the first pulley portion 122B. In embodiments, rotation of the second shaft 110B in a second direction may release the force from the truncated tapered member 140, allowing the truncated tapered member to travel along axis 141 away from the first pulley portion 122B. The second appliance 118B may include one or more spirals, one or more protrusions, or similar structures capable of exerting a force on the truncated tapered member 140 as the second shaft 110B is rotated in the first direction. In embodiments, the second appliance 118B may be cast, machined, or otherwise integrally formed with the second shaft 110B. For example, the second appliance 118B may include a cam, lobe, or similar structure capable of exerting a force on the truncated tapered member 140 as the second shaft 110B is rotated in the first direction. In embodiments, the second appliance 118B may release the force applied to the truncated tapered member 140 when the second shaft 110B is rotated in a second direction opposite the first direction.

The first appliance 118A may be positioned at a first location on the first shaft 110A and the second appliance 118B may be positioned at a second location on the second shaft 110B. In embodiments, the first appliance 118A may be located at a first location on the first shaft 110A that is at the same location as the second location on the second shaft 110B. In such embodiments, either or both the first appliance 118A and the second appliance 118B may displace the truncated tapered member 140 along the axis 141. For example, rotating the first housing (i.e., the first shaft 110A) through an arc of 90° or the second housing through an arc of 90° (i.e., the second shaft 110B) results in the same displacement of the truncated tapered member 140 along axis 141.

In other embodiments, the first appliance 118A may be located at a first location on the first shaft 110A that is at a physically different location on the first shaft 110A than the second location on the second shaft 110B. In such embodiments, the first appliance 118A may displace the truncated tapered member 140 along axis 141 as the first housing is rotated through a portion of an arc (e.g., as the first housing/first shaft 110A is rotated from 0° to 90°) and the second appliance 118B may displace the truncated tapered member 140 along axis 141 as the second housing is rotated through a remaining portion of the arc (e.g., as the second housing/second shaft 110A is rotated from 0° to 90° to form a 180° arc between the first housing and the second housing).

The first variable diameter device 120A and the second variable diameter device 120B (collectively, "variable diameter devices 120") may include any number and/or combination of systems and/or devices capable of providing a variable diameter over which the linking element 130 passes. In embodiments, rotation of the shaft 110 on which the variable diameter device 120 is mounted causes a change in the diameter of the variable diameter device 120. For example, rotation of the shaft 110 in a first direction may cause the diameter of the variable diameter device 120 to increase and rotation of the shaft 110 in a second direction may cause the diameter of the variable diameter device 120 to decrease. As depicted in FIG. 1, the variable diameter device 120 may include a two-piece pulley assembly having a first pulley portion 122 coaxially and longitudinally displaceable along the shaft 110 and a second pulley portion 124 mounted to the shaft 110 at a fixed location. In embodiments, the variable diameter devices 120 may include cams, lobes, or similar eccentric features having a variable radius as the shaft 110 is rotated and disposed in, on, or about the shaft 110. In embodiments, the variable diameter device 120 may be fixed (i.e., non-rotating) with respect to the surface of the shaft 110. In other embodiments, the variable diameter device 120 may be rotatable with respect to the surface of the shaft 110.

As depicted in FIG. 1, the variable diameter devices 120 may include a pulley apportioned into a first pulley portion 122 and a second pulley portion 124. As depicted in FIG. 1, first pulley portion 122 may include a sloped or tapered groove face 126. Similarly, the second pulley portion 124 may include a sloped or tapered groove face 128. As the first pulley portion 122 and the second pulley portion 124 are brought together, the linking element 130 "climbs" the tapered face of the groove 126 and groove 128, thereby effectively increasing the diameter of the portion of the shaft 110 over which the linking element 130 passes. Fabricating the linking element 130 from a non-elastic material, as the linking element 130 "climbs" the tapered face of the groove 126 and groove 128, the distance 115 between the first shaft 110A and the second shaft 110B decreases. Conversely, as the linking element "descends" the tapered face of the groove 126 and groove 128, the distance 115 between the first shaft 110A and the second shaft 110B increases.

The first pulley portion 122 and the second pulley portion 124 may be formed or fabricated using any material or combination of materials. In embodiments, the displaceable first pulley portion 122 may be fabricated using one or more self-lubricating materials such that the first pulley portion 122 is easily displaceable along the surface of the shaft 110. In embodiments, the face of the groove on either or both the first pulley portion 122 and the second pulley portion 124 may include a roughness, surface treatment, and/or coating to provide a defined coefficient of friction. In embodiments, the coefficient of friction of the face of the groove in the first pulley portion 122 and the second pulley portion 124 may be selected to provide a desired "resistance" to a system user rotating the shaft 110 via the device housing. In embodiments, the coefficient of friction of the face of the groove in the first pulley portion 122 and the second pulley portion 124 may be selected to provide a desired "resistance" to maintain the clamshell device in a desired configuration (e.g., open at 90°, open at 135°, open at 180°).

The linking element 130 may include one or more systems, devices, or combinations of systems and devices capable of linking the first variable diameter device 120A on the first shaft with the second variable diameter device 120B on the second shaft 110B. In embodiments, the linking element 130 is a non-elastic (i.e., fixed length) element capable of exerting a compressive force on the first shaft 110A and the second shaft 110B as the diameter of the first variable diameter device 120A and/or the second variable diameter device 120B increases. The linking element 130 may be fabricated using a material having a desired coefficient of friction based on the roughness, surface treatment, and/or coating applied to the variable diameter device 120. In some embodiments, the linking element 130 may include a metal or metal alloy band disposed about the first variable diameter device 120A and the second variable diameter device 120B. In other embodiments, the linking element 130 may include a non-metal band (e.g., carbon fiber) disposed about the first variable diameter device 120A and the second variable diameter device 120B. In embodiments, the edges of the linking element 130 may include one or lips, ridges, raised edges, reinforcements, or other surface features to facilitate the linking element 130 riding up the tapered face of the groove in the first pulley portion 122 and the second pulley portion 124.

The truncated tapered member 140 is disposed at least partially between the first shaft 110A and the second shaft 110B. In embodiments, truncated tapered member 140 may include a member having apertures through which the first shaft 110A and/or the second shaft 110B pass—in such embodiments, the truncated tapered member 140 may extend partially or completely about either or both the first shaft 110A and/or the second shaft 110B. In embodiments, the portion of the truncated tapered member disposed between the first shaft 110A and the second shaft 110B may have a surface that includes a taper complimentary to the taper section 114 of the adjacent shaft 110. In embodiments, the truncated tapered member 140 may be fabricated using one or more self-lubricating materials, such as phenolic resins, nylon, acetal resins (Delrin®) polytetrafluoroethylene (PTFE—Teflon®), or ultrahigh molecular weight polyethylene (UHMWPE). In some implementations, the truncated tapered member 140 may include one or more metals or metal alloys. In some implementations, the truncated tapered member 140 may be fabricated as a unitary (i.e., single) assembly including the first pulley portion 122.

In embodiments, the first appliance 118A and/or the second appliance 118B provide a force against the truncated tapered member 140 that drives the truncated tapered member 140 toward the variable diameter device 120. As the truncated tapered member 140 contacts the variable diameter device 120, the diameter of the variable diameter device 120 increases. As the diameter of the variable diameter device 120 increases, the linking element 130 generates a compressive force that reduces the distance 115 between the first shaft 110A and the second shaft 110B.

Figure 2C:
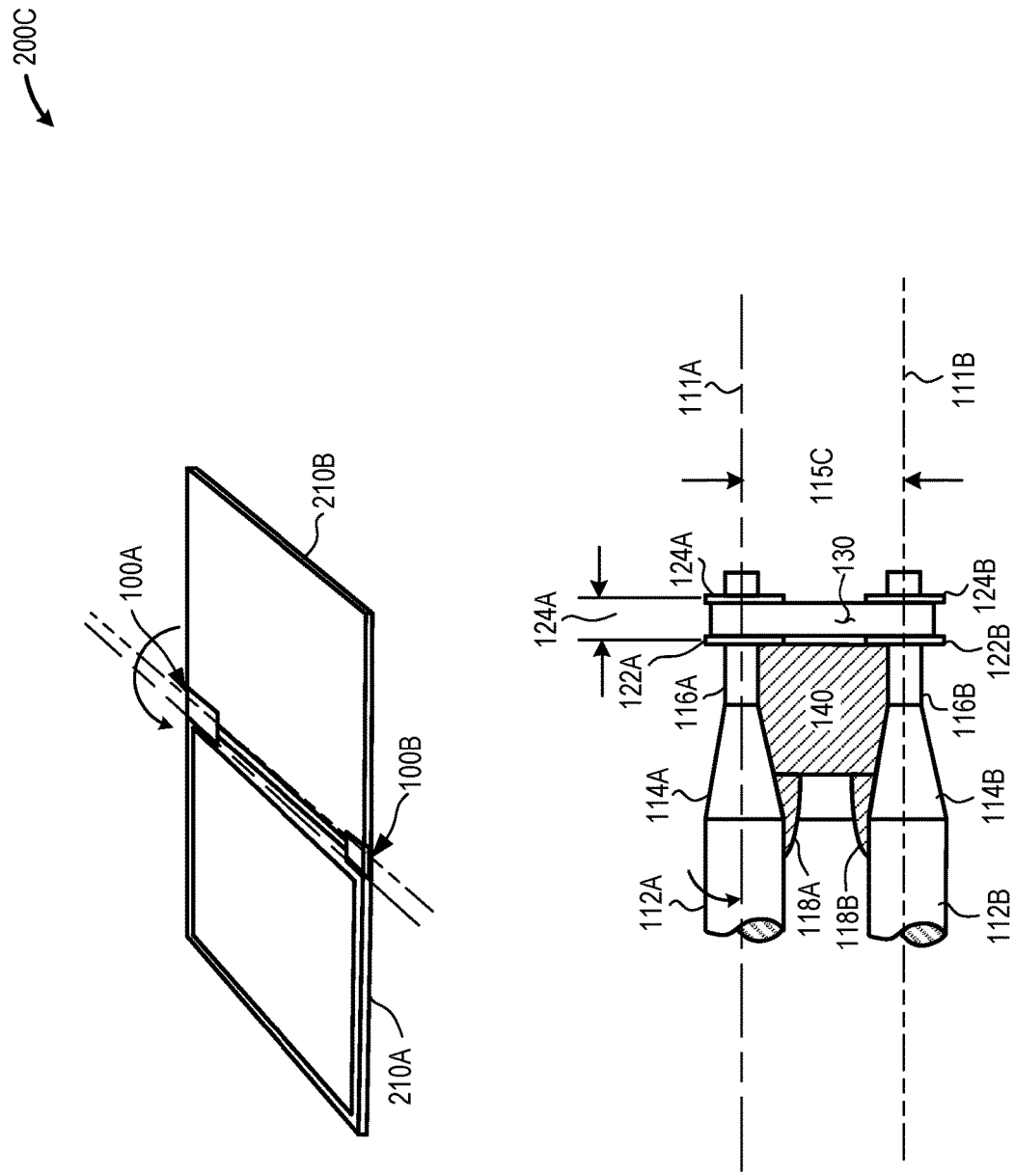
FIG. 2C is an elevation view of an illustrative hinge and an illustrative clamshell device that depicts the location of the truncated tapered member and the variable diameter device when the clamshell device is in an OPEN (i.e., positioned at 180° of arc) state, in accordance with at least one embodiment described herein.

FIG. 2A is an elevation view of an illustrative hinge 100 and an illustrative clamshell device 200A that depicts the location of the truncated tapered member 140 and the variable diameter device 120 when the clamshell device 200A is in a CLOSED (i.e., positioned at 0° of arc) state, in accordance with at least one embodiment described herein. FIG. 2B is an elevation view of an illustrative hinge 100 and an illustrative clamshell device 200B that depicts the location of the truncated tapered member 140 and the variable diameter device 120 when the clamshell device 200B is in a partially OPEN (i.e., positioned at 45° of arc) state, in accordance with at least one embodiment described herein. FIG. 2C is an elevation view of an illustrative hinge 100 and an illustrative clamshell device 200C that depicts the location of the truncated tapered member 140 and the variable diameter device 120 when the clamshell device 200C is in a OPEN (i.e., positioned at 180° of arc) state, in accordance with at least one embodiment described herein.

As depicted in FIG. 2A, the clamshell device 200A includes a first housing 210A pivotably coupled to a second housing 210B by two hinges 100A and 100B (collectively, "hinges 100"). Within each of hinges 100A and 100B, the variable diameter device 120 includes a pulley apportioned into a first pulley portion 122 and a second pulley portion 124. The truncated tapered member 140 is at a position that separates the first shaft 110A and the second shaft 110B by a first distance 115A. In embodiments, the first distance 115A may be: about 2 centimeters (cm) or less; about 1.5 cm or less; about 1 cm or less; about 0.75 cm or less; about 0.5 cm or less; about 0.25 cm or less; about 0.1 cm or less; about 0.05 cm or less; or about 0.01 cm or less. The first distance 115A is the maximum separation distance between the first shaft 110A and the second shaft 110B. When the clamshell device 200A is in the CLOSED position, the first pulley portion 122 and the second pulley portion 124 are separated by a first separation 220A. The first separation 220A is the maximum separation distance of the first pulley portion 122 and the second pulley portion 124.

As depicted in FIG. 2B, the first housing 210A has been rotated through a 45° arc measured with respect to the second housing 210B. As depicted in FIG. 2B, the first housing 210A has been rotated through a 45° arc about the first axis of rotation 111A of the first shaft 110A. Because of the rotation about the first axis of rotation 111A, the truncated tapered member 140 has displaced the first pulley portion 122 to an intermediate position within each of hinges 100A and 100B, increasing the diameter of the first variable diameter device 120A and the second variable diameter device 120B. The increase in diameter of the first variable diameter device 120A and the second variable diameter device 120B causes the linking element 130 to exert a compressive force on the first shaft 110A and the second shaft 110B, decreasing the distance 115B between the shafts 110 to an intermediate value that is less than the first distance 115A. When the clamshell device 200B is positioned in the partially OPEN configuration depicted in FIG. 2B, the first pulley portion 122 and the second pulley portion 124 are separated by an intermediate separation distance 220B which is less than the first separation distance 220A.

As depicted in FIG. 2C, the first housing 210A has been rotated through a 180° arc measured with respect to the second housing 210B. Because of the rotation of the first shaft 110A about the first axis of rotation 111A and/or the rotation of the second shaft 110B about the second axis of rotation 111B, the truncated tapered member 140 has displaced the first pulley portion 122 to a final position within each of hinges 100A and 100B, increasing the diameter of the first variable diameter device 120A and the second variable diameter device 120B to a maximum. The increase in diameter of the first variable diameter device 120A and the second variable diameter device 120B causes the linking element 130 to exert additional compressive force on the first shaft 110A and the second shaft 110B, further decreasing the distance 115C between the shafts 110 to a second distance 115C that is less than the first distance 115A and the intermediate distance 115B. In embodiments, the second distance 115C may be: about 1 centimeter (cm) or less; about 0.75 cm or less; about 0.50 cm or less; about 0.25 cm or less; about 0.20 cm or less; about 0.10 cm or less; about 0.05 cm or less; about 0.025 cm or less; or about 0.01 cm or less. When the clamshell device 200C is disposed in the OPEN configuration depicted in FIG. 2C, the first pulley portion 122 and the second pulley portion 124 are separated by a second separation distance 220C which is less than the first separation distance 220A and the intermediate separation distance 220B.

FIG. 3A is a perspective view of an illustrative hinge 100 disposed in a first position in which the diameter of the variable diameter device 120A is minimized, the separation distance 220A of the variable diameter device 120A is maximized, and the first distance 115A between the first shaft 110A and the second shaft 110B is maximized, in accordance with at least one embodiment described herein. FIG. 3B is a perspective view of the illustrative hinge 100 disposed in a second position in which the diameter of the variable diameter device 120A is maximized, the separation distance 220B of the variable diameter device 120A is minimized, and the second distance 115B between the first shaft 110A and the second shaft 110B is minimized, in accordance with at least one embodiment described herein.

As depicted in FIG. 3A, the variable diameter device 120 may include a pulley apportioned into a first pulley portion 122 and a second pulley portion 124. In embodiments, the truncated tapered member 140 may be disposed at a first location 310 along axis 141. At the first location 310, the truncated tapered member 140 may exert little or even no force on the first pulley portion 122. By exerting little or no force on the first pulley portion 122, a first separation distance 220A occurs between the first pulley portion 122 and the second pulley portion 124. In embodiments, the first separation distance 220A may represent the maximum separation distance between the first pulley portion 122 and the second pulley portion 124. In embodiments, at the maximum separation distance 220A between the first pulley portion 122 and the second pulley portion 124, the first shaft 110A and the second shaft 110B are separated by a first distance 115A. In such embodiments, the first distance 115A may represent the maximum separation distance between the first shaft 110A and the second shaft 110B.

As depicted in FIG. 3B, the truncated tapered member 140 may be disposed at a second location 320 along axis 141. At the second location 320, the truncated tapered member 140 may exert sufficient force on the first pulley portion 122 to drive the first pulley portion 122 toward the second pulley portion 124. In some implementations, the force exerted on the first pulley portion 122 when the truncated tapered member 140 is positioned at the second location 320 is sufficient to force the first pulley portion 122 into contact with the second pulley portion 124. When the first pulley portion 122 contacts the second pulley portion 124, the first pulley portion 122 and the second pulley portion 124 are spaced at a second separation distance 220B. In embodiments, the second separation distance 220B represents the minimum separation distance between the first pulley portion 122 and the second pulley portion 124. In embodiments, at the minimum separation distance 220B between the first pulley portion 122 and the second pulley portion 124, the first shaft 110A and the second shaft 110B are separated by a second distance 115B. In such embodiments, the second distance 115B may represent the minimum separation distance between the first shaft 110A and the second shaft 110B.

Figure 4:
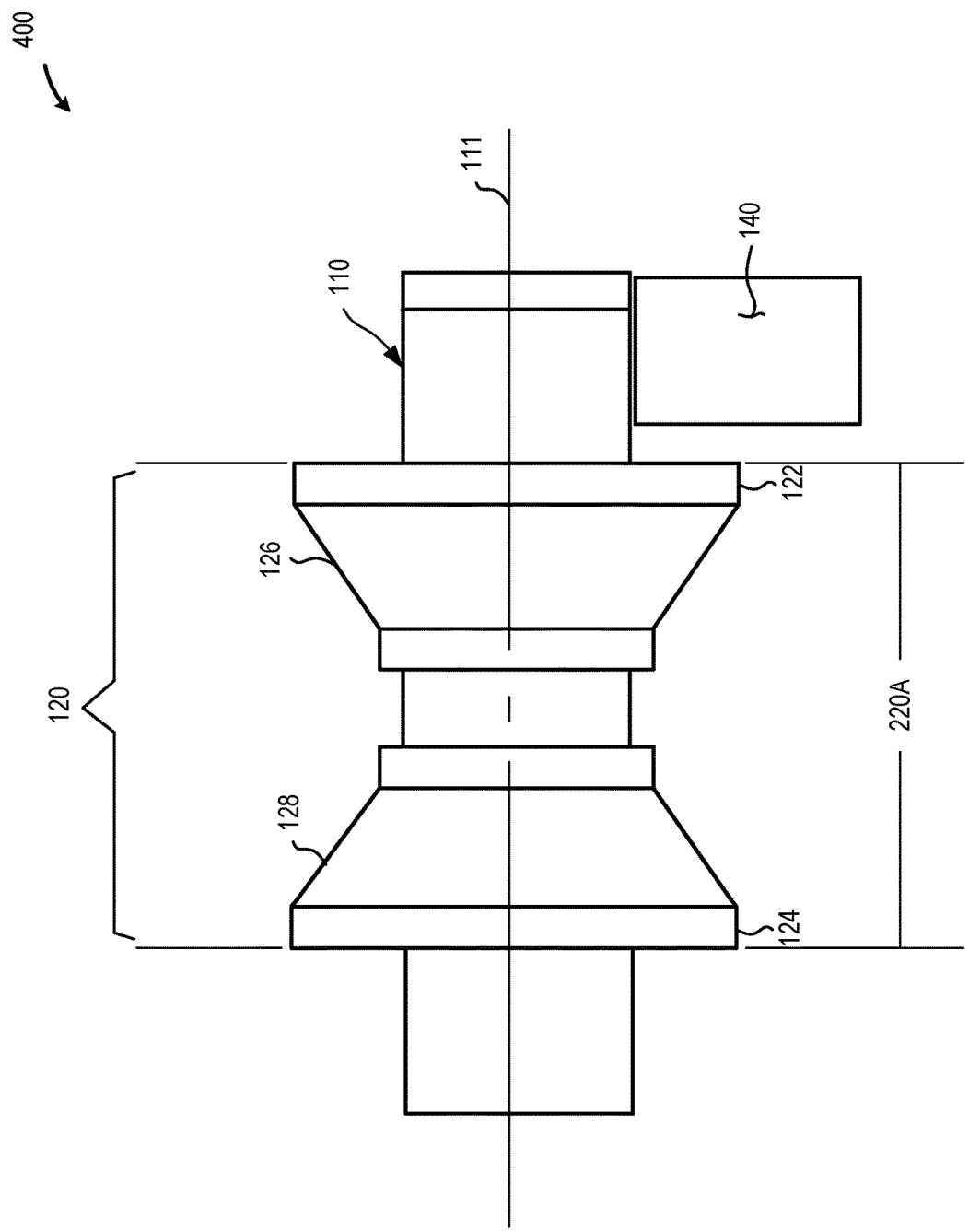
FIG. 4 is an elevation view of an illustrative variable diameter device in the form of a pulley apportioned into a first pulley portion and a second pulley portion, in accordance with at least one embodiment described herein.

FIG. 4 is an elevation view of an illustrative variable diameter device 120 in the form of a pulley apportioned into a first pulley portion 122 and a second pulley portion 124, in accordance with at least one embodiment described herein. As depicted in FIG. 4, the truncated tapered member 140 is in the first location 310 along axis 141. Since the truncated tapered member 140 exerts little or no force on the first pulley portion 122, the pulley portions are separated by the first separation distance 220A. Visible in FIG. 4 is the tapered groove surface 126 of the first pulley portion 122 and the tapered groove surface 128 of the second pulley portion 124.

Figure 5:
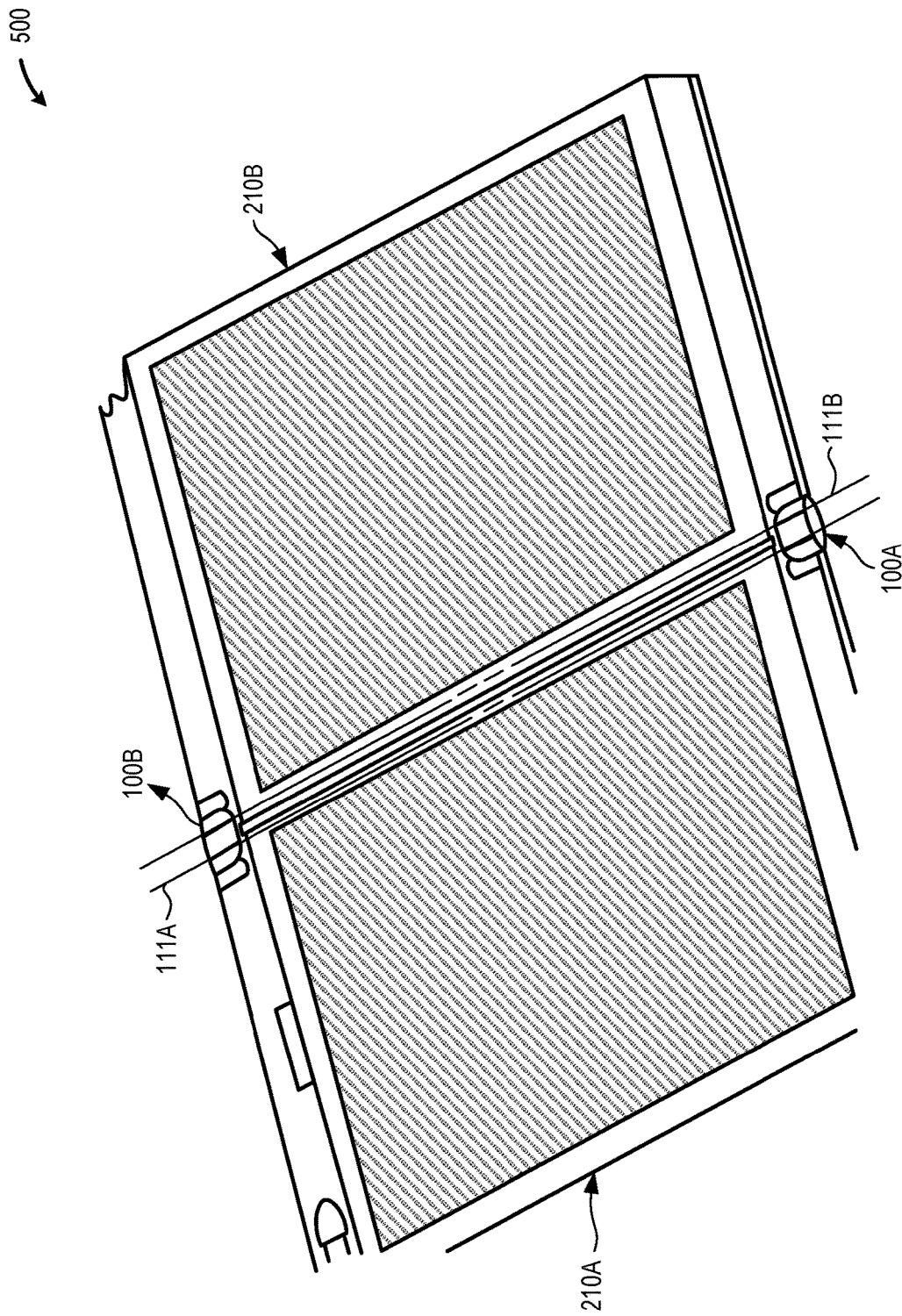
FIG. 5 is a perspective view of an illustrative clamshell device that includes a first electronic device housing pivotably coupled to a second electronic device housing by a first hinge and a second hinge, in accordance with at least one embodiment described herein.

FIG. 5 is a perspective view of an illustrative clamshell device that includes a first electronic device housing 210A pivotably coupled to a second electronic device housing 210B by a first hinge 100A and a second hinge 100B, in accordance with at least one embodiment described herein. In embodiments, such as depicted in FIG. 5, the first housing 210A may include a first display device, such as a liquid crystal display, an organic liquid crystal display, a light emitting diode display, or similar. Similarly, the second housing 210B may include a second display device, such as a liquid crystal display, an organic liquid crystal display, a light emitting diode display, or similar. In embodiments, the hinges 100A and 100B minimize the distance between the first housing 210A and the second housing 210B when the first housing 210A is disposed at an angle of approximately 180° measured with respect to the second housing 210B. By minimizing the distance between the display devices, the system user is beneficially provided a more engaging and seamless experience when using a dual-monitor setup.

Figure 6:
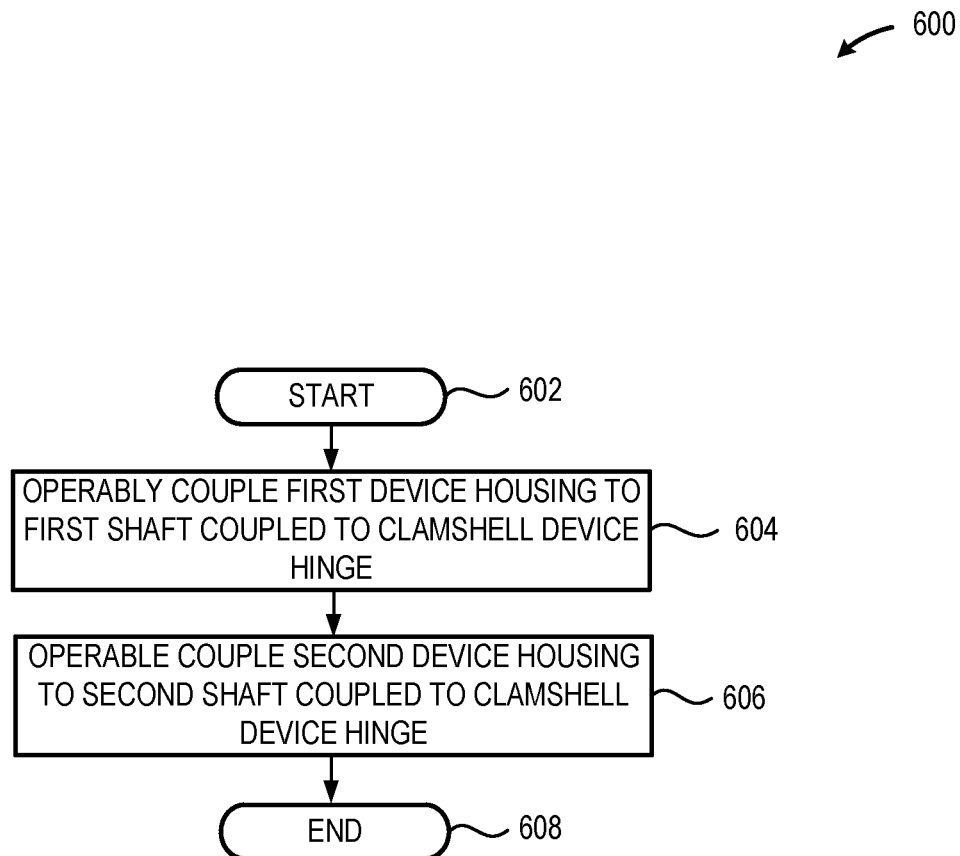
FIG. 6 is a high-level logic flow diagram of an illustrative method of operably coupling a first device housing to a second device housing using at least one clamshell device hinge, in accordance with at least one embodiment described herein.

FIG. 6 is a high-level logic flow diagram of an illustrative method 600 of operably coupling a first device housing 210A to a second device housing 210B using at least one clamshell device hinge 100, in accordance with at least one embodiment described herein. The method 600 commences at 602.

At 604, the first device housing 210A is operably coupled to the first shaft 110A extending from hinge 100.

At 606, the second device housing 210B is operably coupled to the second shaft 110B extending from hinge 100. When the clamshell device is in a CLOSED state (i.e., the first device housing 210A is at an angle of 0° measured with respect to the second device housing 210B), the truncated tapered member 140 is disposed at the first location 310 along axis 141. When positioned at the first location 310, the truncated tapered member 140 exerts little or no force on the first pulley portion 122, thereby allowing a first separation distance 220A between the first pulley portion 122 and the second pulley portion 124. When the first pulley portion 122 and the second pulley portion 124 are separated by the first separation distance 220A, the diameter of the variable diameter device 120 (i.e., the pulley) is minimized and the distance between the axis of rotation of the first shaft 110A and the axis of rotation of the second shaft 110B is maximized. By maximizing the distance between the axis of rotation of the first shaft 110A and the axis of rotation of the second shaft 110B, sufficient clearance exists between the device housings to permit the first device housing 210A to be placed in the CLOSED state, proximate the second device housing 210B.

When the clamshell device is in a fully OPEN state (i.e., the first device housing 210A is at a defined angle, such as 90°, 135°, or 180° measured with respect to the second device housing 210B), the truncated tapered member 140 is disposed at the second location 320 along axis 141. When positioned at the second location 320, the truncated tapered member 140 exerts a force on the first pulley portion 122 sufficient to drive the first pulley portion 122 towards the second pulley portion 124, thereby allowing a second separation distance 220B between the first pulley portion 122 and the second pulley portion 124. The second separation distance 220B is smaller than the first separation distance 220A. When the first pulley portion 122 and the second pulley portion 124 are separated by the second separation distance 220B, the diameter of the variable diameter device 120 (i.e., the pulley) is maximized and the distance between the axis of rotation 111A of the first shaft 110A and the axis of rotation 111B of the second shaft 110B is minimized. By minimizing the distance between the axis of rotation 111A of the first shaft 110A and the axis of rotation 111B of the second shaft 110B, an edge of the first device housing 110A may be disposed proximate an edge of the second device housing 110B. Positioning the device housings 110A and 110B proximate beneficially improves user experience when using the clamshell device, particularly by eliminating the "air gap" between the first device housing 210A and the second device housing 210B when each of the device housings 210 includes a display device being used as a multi-device display.

While FIG. 6 illustrates various operations according to one or more embodiments, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for providing a variable pitch clamshell hinge for use with clamshell housings. The clamshell hinge includes a first shaft coupled to a first variable diameter device and a second shaft coupled to a second variable diameter device. The first variable diameter device and the second variable diameter device are coupled together using an inelastic linking element. As the shafts are rotated in a first direction the variable diameter devices increase in diameter. As the shafts are rotated in a second direction that is opposite the first direction, the variable diameter devices decrease in diameter. As the variable diameter devices increase in diameter, the inelastic linking element exerts a compressive force on the variable diameter devices, decreasing the distance (i.e., the pitch) between the shafts. As the variable diameter devices decrease in diameter, the inelastic linking element relaxes the compressive force on the variable diameter devices, increasing the distance between the shafts.

The ability to adjust the pitch of a hinge in a clamshell device (i.e., the ability to adjust the distance between the first shaft and the second shaft, as described in detail above) represents a significant improvement over existing fixed pitch hinges. The use of a variable pitch hinge beneficially and advantageously permits the minimization or even elimination of the air gap that exists between housings in clamshell devices. This advantage is particularly evident when the clamshell device houses two display devices intended for cooperative use as a multi-monitor display Eliminating the air gap between display device housings in multi-display systems improves the user experience by minimizing the disruptive effect caused by a substantial air gap between display housings. Other clamshell devices, such as smartphones and tablet computers may also benefit from the use of an adjustable pitch hinge as described above.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing a variable pitch hinge for use with clamshell devices.

According to example 1, there is provided a clamshell hinge. The clamshell hinge may include a first variable diameter member disposed concentrically about a first shaft having a first axis of rotation; a second variable diameter member disposed concentrically about a second shaft having a second axis of rotation, the second axis of rotation parallel to the first axis of rotation; a fixed length member slideably disposed about at least a portion of a perimeter of the first variable diameter member and slideably disposed about at least a portion of a perimeter of the second variable diameter member; where, responsive to a rotation of the first shaft through a first arc in a first direction, the first variable diameter member increases in diameter reducing the distance between the first shaft and the second shaft; and where, responsive to a rotation of the first shaft through the first arc in a second direction opposite the first direction, the first variable diameter member decreases in diameter increasing the distance between the first shaft and the second shaft.

Example 2 may include elements of example 1 where the first arc comprises an arc of about 0° to about 180°.

Example 3 may include elements of example 1 where responsive to a rotation of the second shaft through a second arc in a first direction, the second variable diameter member increases in diameter reducing the distance between the first shaft and the second shaft; and where, responsive to a rotation of the second shaft through the second arc in a second direction opposite the first direction, the second variable diameter member decreases in diameter increasing the distance between the first shaft and the second shaft.

Example 4 may include elements of example 3 where the first arc comprises an arc of about 0° to about 180°; and where the second arc comprises an arc of about 0° to about 180°.

Example 5 may include elements of example 3 and the clamshell hinge may further include a truncated tapered member disposed between the first shaft and the second shaft, the truncated tapered member having a first tapered surface and a laterally opposed second tapered surface, the truncated tapered member displaceable along a third axis, the third axis parallel to the first axis and parallel to the second axis; where, at least a portion of the first tapered surface lies proximate a portion of the first shaft having a corresponding complimentary taper to the first tapered surface; and where, at least a portion of the second tapered surface lies proximate a portion of the second shaft having a corresponding complimentary taper to the second tapered surface.

Example 6 may include elements of example 5 and the clamshell hinge may further include a hinge housing disposed at least partially about the first shaft and the second shaft, the hinge housing to maintain the truncated tapered member between the first shaft and the second shaft.

Example 7 may include elements of example 5 where the first variable diameter member comprises a first tapered groove pulley that includes a first pulley half affixed to the first shaft and a second pulley half that is slideably displaceable along the first shaft such that as the distance between the first pulley half and the second pulley half increases, a diameter of the first tapered groove pulley decreases and as the distance between the first pulley half and the second pulley half decreases, the diameter of the first tapered groove pulley increases; and where, the second variable diameter member comprises a second tapered groove pulley that includes a first pulley half affixed to the second shaft and a second pulley half that is slideably displaceable along the second shaft such that as a distance between the first pulley half and the second pulley half increases, a diameter of the second tapered groove pulley decreases and as the distance between the first pulley half and the second pulley half decreases, the diameter of the second tapered groove pulley increases.

Example 8 may include elements of example 7 where the truncated tapered member rigidly couples to the second pulley half of the first tapered groove pulley and the second pulley half of the second tapered groove pulley.

Example 9 may include elements of example 7 and the clamshell hinge may further include a first appliance disposed on or about the first shaft, the first appliance to cause a slideable displacement of the second pulley half of the first tapered groove pulley along the first shaft, the displacement of the second pulley half of the first tapered groove pulley proportionate to the angle of rotation of the first shaft through the first arc; and a second appliance disposed on or about the second shaft, the second appliance to cause a slideable displacement of the second pulley half of the second tapered groove pulley along the second shaft, the displacement of the second pulley half of the second tapered groove pulley proportionate to the angle of rotation of the second shaft through the second arc.

Example 10 may include elements of example 9 where the first appliance comprises an eccentricity formed about a portion of an external circumference of the first shaft; and where, the second appliance comprises an eccentricity formed about a portion of an external circumference of the second shaft.

Example 11 may include elements of example 9 where the first appliance comprises a helical protrusion about at least a portion of an external circumference of the first shaft; and where, the second appliance comprises a helical protrusion about at least a portion of an external circumference of the second shaft.

Example 12 may include elements of example 1 where the first shaft physically couples to a first portion of a clamshell housing such that as the first portion of the clamshell housing rotates, the first shaft rotates through the first arc; and where, the second shaft is physically coupled to a second portion of the clamshell housing such that as the second portion of the clamshell housing rotates, the second shaft rotates through the second arc.

Example 13 may include elements of example 12 where the first portion of the clamshell housing comprises a first display device housing; and where, the second portion of the clamshell housing includes one of: a second display device housing or a laptop keyboard housing.

According to example 14, there is provided a clamshell device. The clamshell device may include: a first housing; a second housing; a first shaft having a first axis of rotation physically coupled to the first housing; a second shaft having a second axis of rotation physically coupled to the second housing, the second axis of rotation parallel to the first axis of rotation; at least one clamshell hinge that includes: a first variable diameter member disposed concentrically about the first shaft; a second variable diameter member disposed concentrically about the second shaft; a fixed length member slideably disposed about at least a portion of a perimeter of the first variable diameter member and slideably disposed about at least a portion of a perimeter of the second variable diameter member; wherein, responsive to a rotation of the first shaft through a first arc in a first direction, the first variable diameter member increases in diameter reducing the distance between the first housing and the second housing to a first distance; and wherein, responsive to a rotation of the first shaft through the first arc in a second direction opposite the first direction, the first variable diameter member decreases in diameter increasing the distance between the first housing and the second housing to a second distance that is greater than the first distance.

Example 15 may include elements of example 14 where the first arc comprises an arc of about 0° to about 180°.

Example 16 may include elements of example 14 where responsive to a rotation of the second shaft through a second arc in a first direction, the second variable diameter member increases in diameter reducing the distance between the first housing and the second housing; and where, responsive to a rotation of the second shaft through the second arc in a second direction opposite the first direction, the second variable diameter member decreases in diameter increasing the distance between the first housing and the second housing.

Example 17 may include elements of example 16 where the first arc comprises an arc of about 0° to about 180°; and where, the second arc comprises an arc of about 0° to about 180°.

Example 18 may include elements of example 16 and the clamshell device may include a truncated tapered member disposed between the first shaft and the second shaft, the truncated tapered member having a first tapered surface and a laterally opposed second tapered surface, the truncated tapered member displaceable along a third axis, the third axis parallel to the first axis and parallel to the second axis; where, at least a portion of the first tapered surface lies proximate a portion of the first shaft having a corresponding complimentary taper to the first tapered surface; and where, at least a portion of the second tapered surface lies proximate a portion of the second shaft having a corresponding complimentary taper to the second tapered surface.

Example 19 may include elements of example 18 and the clamshell device may additionally include a hinge housing disposed at least partially about the first shaft and the second shaft, the hinge housing to maintain the truncated tapered member between the first shaft and the second shaft.

Example 20 may include elements of example 18 where the first variable diameter member comprises a first tapered groove pulley that includes a first pulley half affixed to the first shaft and a second pulley half that is slideably displaceable along the first shaft such that as the distance between the first pulley half and the second pulley half increases, a diameter of the first tapered groove pulley decreases and as the distance between the first pulley half and the second pulley half decreases, the diameter of the first tapered groove pulley increases; and where, the second variable diameter member comprises a second tapered groove pulley that includes a first pulley half affixed to the second shaft and a second pulley half that is slideably displaceable along the second shaft such that as a distance between the first pulley half and the second pulley half increases, a diameter of the second tapered groove pulley decreases and as the distance between the first pulley half and the second pulley half decreases, the diameter of the second tapered groove pulley increases.

Example 21 may include elements of example 20 where the truncated tapered member rigidly couples to the second pulley half of the first tapered groove pulley and the second pulley half of the second tapered groove pulley.

Example 22 may include elements of example 20 and the clamshell device may additionally include a first appliance disposed on or about the first shaft, the first appliance to cause a slideable displacement of the second pulley half of the first tapered groove pulley along the first shaft, the displacement of the second pulley half of the first tapered groove pulley proportionate to the angle of rotation of the first shaft through the first arc; and a second appliance disposed on or about the second shaft, the second appliance to cause a slideable displacement of the second pulley half of the second tapered groove pulley along the second shaft, the displacement of the second pulley half of the second tapered groove pulley proportionate to the angle of rotation of the second shaft through the second arc.

Example 23 may include elements of example 22 where the first appliance comprises an eccentricity formed about a portion of an external circumference of the first shaft; and where, the second appliance comprises an eccentricity formed about a portion of an external circumference of the second shaft.

Example 24 may include elements of example 22 where the first appliance comprises a helical protrusion about at least a portion of an external circumference of the first shaft; and where, the second appliance comprises a helical protrusion about at least a portion of an external circumference of the second shaft.

Example 25 may include elements of example 14 where the first housing comprises a first display device housing; and where, the second housing includes one of: a second display device housing or a laptop keyboard housing.

According to example 26, there is provided a method of forming a clamshell device. The method may include: operably coupling a first housing to a first shaft rotatably coupled to at least one clamshell hinge; operably coupling a second housing to a second shaft rotatably coupled to the at least one clamshell hinge; wherein the first shaft has a first axis of rotation; wherein the second shaft has a second axis of rotation, the second axis of rotation parallel to the first axis of rotation; wherein the at least one clamshell hinge includes: a first variable diameter member disposed concentrically about the first shaft; a second variable diameter member disposed concentrically about the second shaft; a fixed length member slideably disposed about at least a portion of a perimeter of the first variable diameter member and slideably disposed about at least a portion of a perimeter of the second variable diameter member: where, responsive to a rotation of the first shaft through a first arc in a first direction, the first variable diameter member increases in diameter reducing the distance between the first housing and the second housing to a first distance; and where, responsive to a rotation of the first shaft through the first arc in a second direction opposite the first direction, the first variable diameter member decreases in diameter increasing the distance between the first housing and the second housing to a second distance that is greater than the first distance.

Example 27 may include elements of example 26 where the first arc comprises an arc of about 0° to about 180°.

Example 28 may include elements of example 26 where responsive to a rotation of the second shaft through a second arc in a first direction, the second variable diameter member increases in diameter reducing the distance between the first housing and the second housing; and where, responsive to a rotation of the second shaft through the second arc in a second direction opposite the first direction, the second variable diameter member decreases in diameter increasing the distance between the first housing and the second housing.

Example 29 may include elements of example 28 where the first arc comprises an arc of about 0° to about 180°; and where the second arc comprises an arc of about 0° to about 180°.

Example 30 may include elements of example 28 where the at least one clamshell hinge may further include: a truncated tapered member disposed between the first shaft and the second shaft, the truncated tapered member having a first tapered surface and a laterally opposed second tapered surface, the truncated tapered member displaceable along a third axis, the third axis parallel to the first axis and parallel to the second axis; where at least a portion of the first tapered surface lies proximate a portion of the first shaft having a corresponding complimentary taper to the first tapered surface; and where at least a portion of the second tapered surface lies proximate a portion of the second shaft having a corresponding complimentary taper to the second tapered surface.

Example 31 may include elements of example 30 where the at least one clamshell hinge may further include a hinge housing disposed at least partially about the first shaft and the second shaft, the hinge housing to maintain the truncated tapered member between the first shaft and the second shaft.

Example 32 may include elements of example 30 where the first variable diameter member comprises a first tapered groove pulley that includes a first pulley half affixed to the first shaft and a second pulley half that is slideably displaceable along the first shaft such that as the distance between the first pulley half and the second pulley half increases, a diameter of the first tapered groove pulley decreases and as the distance between the first pulley half and the second pulley half decreases, the diameter of the first tapered groove pulley increases; and where the second variable diameter member comprises a second tapered groove pulley that includes a first pulley half affixed to the second shaft and a second pulley half that is slideably displaceable along the second shaft such that as a distance between the first pulley half and the second pulley half increases, a diameter of the second tapered groove pulley decreases and as the distance between the first pulley half and the second pulley half decreases, the diameter of the second tapered groove pulley increases.

Example 33 may include elements of example 32 where the truncated tapered member rigidly couples to the second pulley half of the first tapered groove pulley and the second pulley half of the second tapered groove pulley.

Example 34 may include elements of example 32 where the at least one clamshell hinge may further include a first appliance disposed on or about the first shaft, the first appliance to cause a slideable displacement of the second pulley half of the first tapered groove pulley along the first shaft, the displacement of the second pulley half of the first tapered groove pulley proportionate to the angle of rotation of the first shaft through the first arc; and a second appliance disposed on or about the second shaft, the second appliance to cause a slideable displacement of the second pulley half of the second tapered groove pulley along the second shaft, the displacement of the second pulley half of the second tapered groove pulley proportionate to the angle of rotation of the second shaft through the second arc.

Example 35 may include elements of example 34 where the first appliance comprises an eccentricity formed about a portion of an external circumference of the first shaft; and where the second appliance comprises an eccentricity formed about a portion of an external circumference of the second shaft.

Example 36 may include elements of example 34 where the first appliance comprises a helical protrusion about at least a portion of an external circumference of the first shaft; and where the second appliance comprises a helical protrusion about at least a portion of an external circumference of the second shaft.

Example 37 may include elements of example 26 where the first housing includes a first electronic device housing; and where the second housing includes a second electronic device housing.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A clamshell hinge, comprising:
    a first variable diameter member disposed concentrically about a first shaft having a first axis of rotation;
    a second variable diameter member disposed concentrically about a second shaft having a second axis of rotation, the second axis of rotation parallel to the first axis of rotation;
    a fixed length member slideably disposed about at least a portion of a perimeter of the first variable diameter member and slideably disposed about at least a portion of a perimeter of the second variable diameter member; and
    a truncated tapered member disposed between the first shaft and the second shaft, the truncated tapered member having a first tapered surface and a laterally opposed second tapered surface, the truncated tapered member displaceable along a third axis, the third axis parallel to the first axis and parallel to the second axis;
    wherein:
    responsive to a rotation of the first shaft through a first arc in a first direction, the first variable diameter member increases in diameter reducing the distance between the first shaft and the second shaft; and
    responsive to a rotation of the first shaft through the first arc in a second direction opposite the first direction, the first variable diameter member decreases in diameter increasing the distance between the first shaft and the second shaft;
    responsive to a rotation of the second shaft through a second arc in a first direction, the second variable diameter member increases in diameter reducing the distance between the first shaft and the second shaft; and
    responsive to a rotation of the second shaft through the second arc in a second direction opposite the first direction, the second variable diameter member decreases in diameter increasing the distance between the first shaft and the second shaft;

at least a portion of the first tapered surface lies proximate a portion of the first shaft having a corresponding complimentary taper to the first tapered surface; and at least a portion of the second tapered surface lies proximate a portion of the second shaft having a corresponding complimentary taper to the second tapered surface.

2. The clamshell hinge of claim 1 wherein the first arc comprises an arc substantially between 0° and 180°.

3. The clamshell hinge of claim 1:
wherein the first arc comprises an arc substantially between 0° and 180°; and
wherein the second arc comprises an arc substantially between 0° and 180°.

4. The clamshell hinge of claim 1, further comprising:
a hinge housing disposed at least partially about the first shaft and the second shaft, the hinge housing to maintain the truncated tapered member between the first shaft and the second shaft.

5. The clamshell hinge of claim 1:
wherein the first variable diameter member comprises a first tapered groove pulley that includes a first pulley half affixed to the first shaft and a second pulley half that is slideably displaceable along the first shaft such that as the distance between the first pulley half and the second pulley half increases, a diameter of the first tapered groove pulley decreases and as the distance between the first pulley half and the second pulley half decreases, the diameter of the first tapered groove pulley increases; and
wherein the second variable diameter member comprises a second tapered groove pulley that includes a first pulley half affixed to the second shaft and a second pulley half that is slideably displaceable along the second shaft such that as a distance between the first pulley half and the second pulley half increases, a diameter of the second tapered groove pulley decreases and as the distance between the first pulley half and the second pulley half decreases, the diameter of the second tapered groove pulley increases.

6. The clamshell hinge of claim 5 wherein the truncated tapered member rigidly couples to the second pulley half of the first tapered groove pulley and the second pulley half of the second tapered groove pulley.

7. The clamshell hinge of claim 5, further comprising:
a first appliance disposed on or about the first shaft, the first appliance to cause a slideable displacement of the second pulley half of the first tapered groove pulley along the first shaft, the displacement of the second pulley half of the first tapered groove pulley proportionate to the angle of rotation of the first shaft through the first arc; and
a second appliance disposed on or about the second shaft, the second appliance to cause a slideable displacement of the second pulley half of the second tapered groove pulley along the second shaft, the displacement of the second pulley half of the second tapered groove pulley proportionate to the angle of rotation of the second shaft through the second arc.

8. The clamshell hinge of claim 7:
wherein the first appliance comprises an eccentricity formed about a portion of an external circumference of the first shaft; and wherein the second appliance comprises an eccentricity formed about a portion of an external circumference of the second shaft.

9. The clamshell hinge of claim 7:
wherein the first appliance comprises a helical protrusion about at least a portion of an external circumference of the first shaft; and
wherein the second appliance comprises a helical protrusion about at least a portion of an external circumference of the second shaft.

10. The clamshell hinge of claim 1:
wherein the first shaft physically couples to a first portion of a clamshell housing such that as the first portion of the clamshell housing rotates, the first shaft rotates through the first arc; and
wherein the second shaft is physically coupled to a second portion of the clamshell housing such that as the second portion of the clamshell housing rotates, the second shaft rotates through the second arc.

11. The clamshell hinge of claim 10:
wherein the first portion of the clamshell housing comprises a first display device housing; and
wherein the second portion of the clamshell housing includes one of: a second display device housing or a laptop keyboard housing.

12. A method of forming a clamshell device, comprising:
providing at least one clamshell hinge;
operably coupling a first housing to a first shaft rotatably coupled to the at least one clamshell hinge; and
operably coupling a second housing to a second shaft rotatably coupled to the at least one clamshell hinge;
wherein the first shaft has a first axis of rotation;
wherein the second shaft has a second axis of rotation that is parallel to the first axis of rotation;
wherein providing the at least one clamshell hinge includes:
concentrically disposing a first variable diameter member about the first shaft;
concentrically disposing a second variable diameter member about the second shaft; and
slideably disposing a fixed length member about at least a portion of a perimeter of the first variable diameter member and about at least a portion of a perimeter of the second variable diameter member;
wherein:
concentrically disposing the first variable diameter member about the first shaft includes disposing the first variable diameter member such that in operation, responsive to a rotation of the first shaft through a first arc in a first direction, the first variable diameter member increases in diameter reducing the distance between the first housing and the second housing to a first distance;
concentrically disposing the first variable diameter member about the first shaft further includes disposing the first variable diameter member such that in operation, responsive to a rotation of the first shaft through the first arc in a second direction opposite the first direction, the first variable diameter member decreases in diameter increasing the distance between the first housing and the second housing to a second distance that is greater than the first distance;
concentrically disposing the second variable diameter member about the second shaft includes disposing the second variable diameter member such that in operation, responsive to a rotation of the second shaft through a second arc in a first direction, the second variable diameter member increases in diameter reducing the distance between the first housing and the second housing; and concentrically disposing the second variable diameter member about the second shaft further includes disposing the second variable diameter member such that in operation, responsive to a rotation of the second shaft through the second arc in a second direction opposite the first direction, the second variable diameter member decreases in diameter increasing the distance between the first housing and the second housing;

providing the at least one clamshell hinge further comprises providing a truncated tapered member disposed between the first shaft and the second shaft, the truncated tapered member having a first tapered surface and a laterally opposed second tapered surface, the truncated tapered member displaceable along a third axis, the third axis parallel to the first axis and parallel to the second axis;

at least a portion of the first tapered surface lies proximate a portion of the first shaft having a corresponding complimentary taper to the first tapered surface; and at least a portion of the second tapered surface lies proximate a portion of the second shaft having a corresponding complimentary taper to the second tapered surface.

13. The method of claim 12 wherein the first arc comprises an arc substantially between 0° and 180°.

14. The method of claim 12,
wherein the first arc comprises an arc substantially between 0° and 180°; and
wherein the second arc comprises an arc substantially between 0° and 180°.

15. The method of claim 12, wherein providing the at least one clamshell hinge further comprises:
providing a hinge housing disposed at least partially about the first shaft and the second shaft, the hinge housing to maintain the truncated tapered member between the first shaft and the second shaft.

16. The method of claim 12:
wherein the first variable diameter member comprises a first tapered groove pulley that includes a first pulley half affixed to the first shaft and a second pulley half that is slideably displaceable along the first shaft such that as the distance between the first pulley half and the second pulley half increases, a diameter of the first tapered groove pulley decreases and as the distance between the first pulley half and the second pulley half decreases, the diameter of the first tapered groove pulley increases; and wherein the second variable diameter member comprises a second tapered groove pulley that includes a first pulley half affixed to the second shaft and a second pulley half that is slideably displaceable along the second shaft such that as a distance between the first pulley half and the second pulley half increases, a diameter of the second tapered groove pulley decreases and as the distance between the first pulley half and the second pulley half decreases, the diameter of the second tapered groove pulley increases.

17. The method of claim 16 wherein the truncated tapered member rigidly couples to the second pulley half of the first tapered groove pulley and the second pulley half of the second tapered groove pulley.

18. The method of claim 16 wherein the at least one clamshell hinge further comprises:
a first appliance disposed on or about the first shaft, the first appliance to cause a slideable displacement of the second pulley half of the first tapered groove pulley along the first shaft, the displacement of the second pulley half of the first tapered groove pulley proportionate to the angle of rotation of the first shaft through the first arc; and a second appliance disposed on or about the second shaft, the second appliance to cause a slideable displacement of the second pulley half of the second tapered groove pulley along the second shaft, the displacement of the second pulley half of the second tapered groove pulley proportionate to the angle of rotation of the second shaft through the second arc.

19. The method of claim 18:
wherein the first appliance comprises an eccentricity formed about a portion of an external circumference of the first shaft; and
wherein the second appliance comprises an eccentricity formed about a portion of an external circumference of the second shaft.

20. The method of claim 18:
wherein the first appliance comprises a helical protrusion about at least a portion of an external circumference of the first shaft; and
wherein the second appliance comprises a helical protrusion about at least a portion of an external circumference of the second shaft.

21. The method of claim 20:
wherein the first housing comprises a first electronic device housing; and
wherein the second housing comprises a second electronic device housing.

* * * * *